Dec. 17, 1968   HANS-CHRISTIAN DEUTSCHER ET AL   3,416,180
WINDSHIELD WIPER SUPPORTING JOINT CONSTRUCTION
Filed May 13, 1966
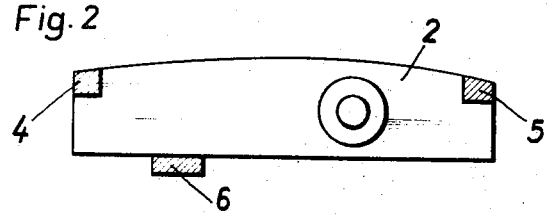
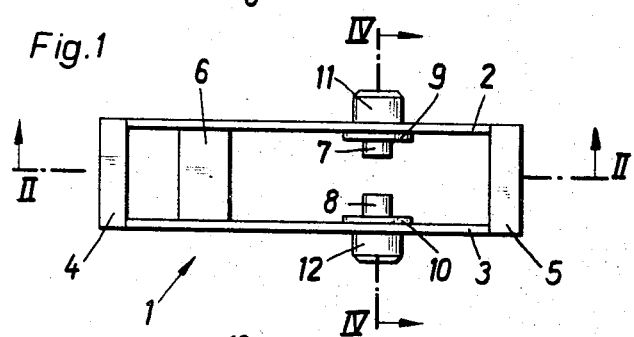
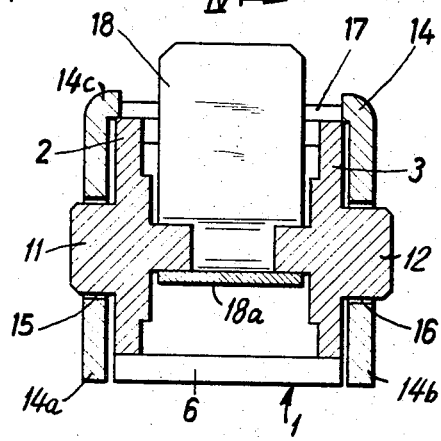
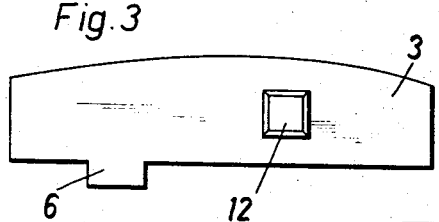
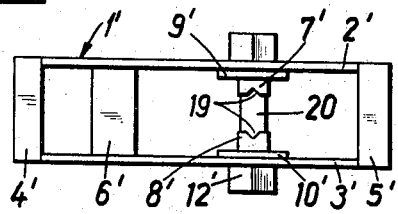
Inventors
HANS-CHRISTIAN DEUTSCHER
KURT BAUER
ALFRED KOHLER
BY McGlew & Toren
ATTORNEYS United States Patent Office 3,416,180
Patented Dec. 17, 1968

3,416,180
WINDSHIELD WIPER SUPPORTING JOINT
CONSTRUCTION
Hans-Christian Deutscher, Ludwigsburg, Kurt Bauer, Kleiningersheim, and Alfred Kohler, Bietigheim, Germany, assignors to SWF-Spezialfabrik fur Autozubehor Gustav Rau G.m.b.H., Bietigheim, Germany
Filed May 13, 1966, Ser. No. 549,939
Claims priority, application Germany, Oct. 2, 1965,
S 99,911
6 Claims. (Cl. 15—250.32)

ABSTRACT OF THE DISCLOSURE

A joint construction for mounting a supporting wiper arm to a U-shaped stirrup member comprises a substantially rectangular frame member having longitudinal walls which are each provided with an exterior projection for engaging into an opening in a leg portion of the stirrup member and are also provided with an interior projection to provide an engagement point for a U-shaped end of a wiper support arm. The construction provides a means for simple engagement of the support arm with the U-shaped stirrup and requires only that the rectangular frame be inserted into the stirrup by compressing the side walls to permit clearance of the projections and engagement of the projections in the openings of the leg portions of the stirrup. Thereafter, the support arm of the wiper may be easily engaged over the inwardly directed pin formations of the frame member. The wiper support arm is made wide enough to prevent further compression of the frame member and thus effectively locks the member in position engaged with the stirrup.

---

This invention relates in general to windshield wiper construction, and in particular to a new and useful joint formation for suspending a wiper blade element from a supporting arm.

The present invention is particularly concerned with the connection between parts of a windshield wiper blade assembly and particularly the suspension of a stirrup carrying the wiper blade elements from a supporting arm. At the present time, the main stirrup carrying the wiper blade rubber piece is supported from the wiper blade arm through the provision of a pivot element which is riveted through the main stirrup. In order to carry out this riveting, it is necesary to provide a separate manufacturing operation which increases the manufacturing cost of the wiper. Attempts have been made to overcome this by forming a plastic insert directly into the main stirrup such as by injection molding. This requires, however, tools with larger dimensions into which the main stirrup must be inserted. The disadvantage of such an arrangement is that the stirrup and the tools must have unusually accurate tolerances in order to permit satisfactory insertion of the tool. Here again, the manufacturing costs are high.

In accordance with the present invention, there is provided an insert preferably made of plastic material which is characterized by the fact that it uses only a small amount of material and which may be easily inserted into a substantially U-shaped windshield wiper stirrup and fitted into slots defined therein. For this purpose, the insert is made with an outwardly formed projection or protuberance on each side which engages into associated slots defined in a corresponding leg portion of the stirrup member. The insert also includes an inwardly extending cylindrical formation on each interior wall which are aligned to provide opposed cylindrical bearing pins for engagement of a hook-shaped end of a wiper support arm. The projections which are formed on the exterior of the surface are advantageously formed in alignment or as extensions of the internally projecting pins. The projections may advantageously have a circular or polygonal cross section. At least the longitudinal walls of the insert are made of elastic material so that they can be compressed in a transverse direction in order to be inserted between opposed leg portions of the substantiallly U-shaped stirrup member with which they are associated. After the insert is located between the stirrup member's legs, the projections on the respective sides of the stirrup are aligned with corresponding slots or openings defined in the respective side walls of the stirrup member. The compression of the stirrup member is then released and the projections are permitted to engage in the slots to hold the stirrup member tightly in position. The top of the stirrup member is also cut away or slotted directly above the insert in order to permit the connection of the supporting wiper blade arm which then includes the U-shaped end which may easily engage around the opposed cylindrical pins.

Accordingly, it is an object of the invention to provide an improved mounting joint construction for supporting the stirrup member of a wiper blade from an arm portion.

A further object of the invention is to provide a wiper blade construction which includes a U-shaped stirrup for supporting a wiper blade element into which is fitted a substantially rectangular or frame-shaped insert, the insert having projecting portions engaged in the side of the U-shaped member and including opposed internal cylindrical formations which are engageable by a supporting arm which is inserted from the top through a slotted opening defined in the U-shaped end member.

A further object of the invention is to provide a windshield wiper construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a top plan view of an insert constructed in accordance with the invention;

FIG. 2 is a section taken on the line II—II of FIG. 1;

FIG. 3 is a side elevational view of the insert;

FIG. 4 is a transverse sectional view taken on the line IV—IV of FIG. 1 of a stirrup member with an insert mounted therein; and FIG. 5 is a view similar to FIG. 1 of another embodiment of the invention.

Referring to the drawings in particular, the invention embodied therein in FIGS. 1 to 4 comprises an insert generally designated 1 which comprises a frame-shaped member having longitudinal walls 2 and 3 which are connected by cross ribs or webs 4, 5 and 6. In accordance with the invention, the inner surfaces of the longitudinal walls are provided with two axially opposing bearing pins 7 and 8. Between the longitudinal walls and the bearing pins 7 and 8 are arranged larger sized but lesser thickness bearing guide bosses 9 and 10. The outer surfaces of the longitudinal walls 2 and 3 include axial extensions of the bearings pins 7 and 8 forming securing projections 11 and 12 which advantageously may have a circular or polygonal cross section.

The insert 1 is assembled together with a main stirrup 14 of a windshield wiper assembly. The stirrup 14 is substantially U-shaped in cross section and it includes a top slot 17 for access of a connecting or supporting arm 18. Stirrup 14 also includes side legs 14a and 14b having slots 15 and 16 of a configuration comparable to the formation of the projections 11 and 12. In order to introduce the insert 1 into the stirrup 14, it is necessary to compress the longitudinal walls 2 and 3 of the insert in order to permit admission of the insert projections 11 and 12 between the legs 14a and 14b. The projections 11 and 12 are aligned with the openings 15 and 16 and permitted to move outwardly therein in order to lock the insert in position. The webs 4 and 5 then bear against the underside of the top wall 14c of the stirrup and provide a secure fitting of the insert within the stirrup. When the projections 11 and 12 are made with polygonal configuration, the position of the insert within the stirrup is already set. If the cross section is made circular, the position is secured by the cross ribs 4 and 5 arranged under the web of the main stirrup. The wiper arm 18 is provided with a locking spring end portion 18a which engages around the cylindrical projections 7 and 8. Since the arm member 18 is substantially as wide as the spacing between the widened portions 9 and 10 on the sides of the insert, there will be no tendency for the insert to collapse when it is in position within the stirrup 14. However, in some instances it is desirable to form a stirrup 1' as indicated in FIG. 5 in which event the bearing pins 7' and 8' are provided with grooves 19 to facilitate the insertion of a spacer member 20 therebetween which becomes locked in place after the walls 2' and 3' are relaxed. The spacer arm may be permanently secured even after installation of the wiper arm since it does not interfere with the connection or rotatable movement.

While specific embodiments of the invention have been shown and described in detail to illustrate the application of the inventive principles, it will be understood that the invention may be embodied otherwise without departing from such principles.

What is claimed is:

1. A windshield wiper supporting joint construction for supporting a stirrup from a wiper arm member, comprising a substantially U-shaped stirrup member having a web portion with a top slot therethrough and opposed depending leg portions extending downwardly from each end of said web portion, each of said leg portions having an opening therein, and a substantially frame-shaped insert having longitudinal walls extending substantially parallel to said leg portions and including a projection which extends into an associated slot of said leg portions of said U-shaped member, said longitudinal walls of said insert including an internal projection extending inwardly from each side for supporting the wiper arm member which is accessible to the interior of said U-shaped member through the top slot therein, said longitudinal walls of said insert member being of a bendable material to permit them to be compressed inwardly for insertion into said U-shaped stirrup member, said internal bearing pins being spaced sufficiently apart to permit inward bending movement of said side walls.

2. A windshield wiper supporting joint construction according to claim 1, wherein said insert member includes substantially rectangular side walls, a cross member connecting said side walls together at each end adjacent the tops thereof, and a cross member connecting said side walls intermediate the ends thereof adjacent the bottom thereof.

3. A windshield wiper supporting joint construction according to claim 1, wherein said projections of said insert member are substantially cylindrical.

4. A windshield wiper supporting joint construction according to claim 1, wherein the projections of said longitudinal walls of said insert member are polygonal, said side legs of said insert member having slots of a configuration comparable to the formations of said projections to tightly receive them therein.

5. A windshield wiper supporting joint construction according to claim 1, wherein said bearing pins have end faces with locking notches defined therein, and a spacer member positioned between said bearing pin end faces and locked in engagement therewith.

6. An insert for mounting a supporting wiper arm to a U-shaped stirrup member having a web portion with a slot therethrough to receive a wiper support arm and a leg portion depending from each side of said web portion each with an opening therethrough, comprising a substantially rectangular frame member having longitudinal walls of substantially rectangular configuration, a first cross member connecting said longitudinal walls together adjacent their one ends and a second cross member connecting said longitudinal members together adjacent their opposite ends, said longitudinal wall members each having an exterior projection formed thereon adapted to be engaged in respective openings of the stirrup leg portions and an interior pin formation extending inwardly in substantial alignment with the projection, said logitudinal walls being bendable to permit compression inwardly for installation between the leg portions of the stirrup member, the wiper support arm being adapted to engage around a portion of each of said interior pin formations and prevent inward compression of the longitudinal walls.

References Cited

UNITED STATES PATENTS 2,798,244   7/1957   Nesson _____ 15—250.32

FOREIGN PATENTS 901,436   7/1962   Great Britain.

WALTER A. SCHEEL, *Primary Examiner.*

R. I. SMITH, *Assistant Examiner.*